United States Patent [19]

Stewart

[11] Patent Number: 4,933,227

[45] Date of Patent: Jun. 12, 1990

[54] AIRCRAFT WINDSHIELD

[75] Inventor: Sherman D. Stewart, Scottsboro, Ala.

[73] Assignee: PPG Industries, Inc., Pittsburgh, Pa.

[21] Appl. No.: 292,057

[22] Filed: Dec. 30, 1988

[51] Int. Cl.$^5$ .................................................. B32B 17/06
[52] U.S. Cl. .................................... 428/192; 428/426; 428/417; 428/413; 428/412; 52/789; 52/784; 52/398; 52/397; 296/84.1; 156/330; 156/108; 156/107; 156/106; 156/104; 156/102
[58] Field of Search ................ 52/789, 784, 397, 398; 156/102, 104, 106, 107, 108, 330; 428/192, 412, 413, 417, 426; 296/84.1

[56] References Cited

U.S. PATENT DOCUMENTS

| | | |
|---|---|---|
| 3,919,022 | 11/1975 | Stefanik . |
| 3,953,630 | 4/1976 | Roberts et al. . |
| 4,004,388 | 1/1977 | Stefanik . |
| 4,046,933 | 9/1977 | Stefanik . |
| 4,277,294 | 7/1981 | Orcutt .............................. 156/102 |

*Primary Examiner*—Ellis P. Robinson
*Attorney, Agent, or Firm*—Andrew C. Siminerio

[57] ABSTRACT

A glass/polycarbonate laminate is provided with an edge attachment configuration that reduces the deflection of the laminate and reduces the loading on the polycarbonate plies of the laminate.

14 Claims, 1 Drawing Sheet

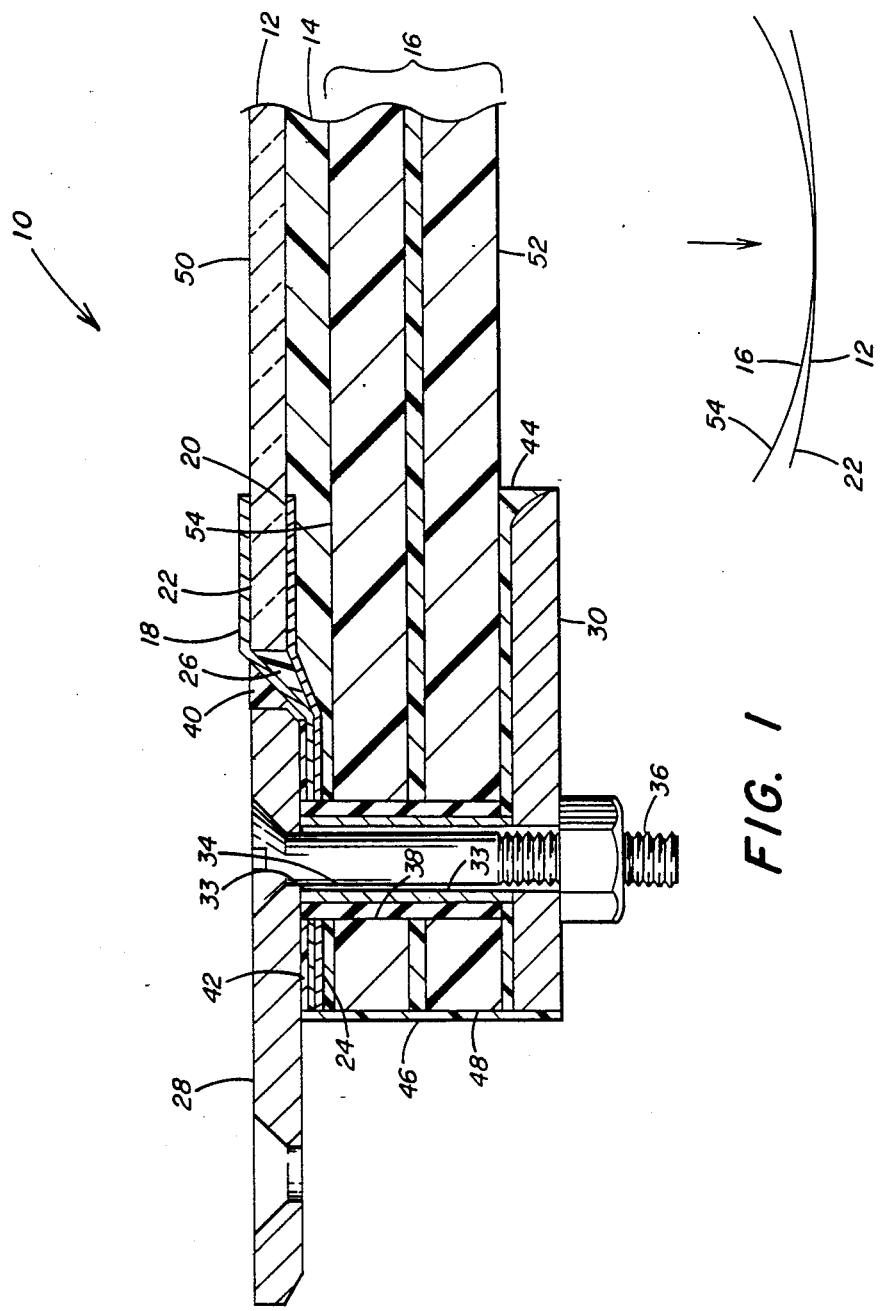

AIRCRAFT WINDSHIELD

BACKGROUND OF THE INVENTION

1. Field of the Invention

The present invention relates to an aircraft window and more particularly to a lightweight, glass and polycarbonate laminate for an aircraft windshield that reduces windshield deflection due to internal aircraft cabin pressure and reduces the load on the polycarbonate plies of the windshield.

2a. Technical Considerations

As an aircraft flies to higher altitudes, the air within the aircraft cabin is pressurized. As a result, the transparencies in the aircraft experience cyclic loading each time the aircraft's internal pressure changes in response to altitude changes. This cyclic loading on polycarbonate plies of the windows may lead to premature failure through fatigue. Because of the relatively low stiffness of polycarbonate as compared to other commonly used transparent material, the cyclic loading causes the polycarbonate plies of the transparency to deflect outwardly, changing the surface contour of the window as well as the entire aircraft. To reduce this deflection, a more rigid ply, for example a glass outer ply, may be incorporated into the laminated transparency. However, when the perimeter of the polycarbonate plies is restrained through attachment to an airframe, while under pressurization, center deflection of the polycarbonate will tend to cause the transparency to delaminate about its periphery, between the glass ply and the remaining polycarbonate plies of the transparency due to the more rigid glass deflecting less at the periphery.

It would be useful to have an aircraft transparency, and in particular an aircraft windshield, utilizing polycarbonate and glass plies that avoids these deleterious delamination effects while maintaining a structurally sound transparency capable of withstanding significant impacts that can occur to an aircraft windshield.

2b. Patents of Interest

U.S. Pat. Nos. 3,919,022 and 4,004,388 to Stefanik disclose a window panel edge construction for a glass laminate which includes molded, fiber glass reinforced, thermosetting resinous straps adhered to and overlapping both sides of the glass plies of the panels in a peripheral area outside the viewing area. During lamination, the straps cure to form rigid connecting members rigidly secured to the window glass plies and other edge materials.

U.S. Pat. No. 3,953,630 to Roberts et al. teaches a laminated transparent assembly which includes a glass laminate with polyvinyl butyral interlayers and a high tensile strength, flexible insert which extends around and has a portion embedded in the periphery of the interlayer. A portion of the insert which extends beyond the periphery of the transparency is used to mount the transparency to a vehicle.

U.S. Pat. No. 4,046,933 to Stefanik teaches a transparent laminated window which uses a flexible fabric tape impregnated with a silicone elastomeric adhesive to bond at least one of the plies or reinforcements of the window to another element of the window.

SUMMARY OF THE INVENTION

A window panel for a vehicle that is subject to repeated internal pressurization, such as an aircraft, includes an outer rigid sheet secured to an inner rigid sheet. The outer sheet is more rigid than the inner sheet and in one particular embodiment of the invention, the outer sheet is glass and the inner sheet is a polycarbonate laminate. The peripheral edge of the inner sheet extends beyond the peripheral edge of the outer sheet. A strap member is secured to a major surface of the outer sheet about its peripheral edge and extends over the inner sheet to the peripheral edge of the inner sheet. In a preferred embodiment of the invention, a pair of strap members are secured to opposing major surfaces of the outer sheet. A rigid edge attachment is secured to the edge of the inner sheet and the extending portion of the straps such that the outer sheet is positioned within the periphery defined by the edge attachment.

In the present invention, the outer glass ply limits the outward deflection of the window when subjected to pressurization loading because the glass is more rigid than the inner polycarbonate laminate and is restrained about its periphery by the straps. As a result, there is less cyclic loading on the inner polycarbonate laminate and therefore less fatigue. Furthermore since the inner polycarbonate laminate is limited to deflect the same amount as the outer glass ply, the window will not delaminate about its periphery.

BRIEF DESCRIPTION OF THE DRAWINGS

FIG. 1 is a partial cross-sectional view of an aircraft transparency incorporating the novel features of the present invention.

FIG. 2 is a schematic illustrating the relative deflection of a glass ply and a polycarbonate ply.

DETAILED DESCRIPTION OF THE INVENTION

FIG. 1 illustrates a cross-sectional view of an aircraft assembly 10 which is the subject of the present invention. It should be appreciated that the assembly 10 may be flat, slightly curved, or dramatically curved to form an aircraft canopy. Outer glass ply 12 is secured by interlayer 14 to an inner polycarbonate laminate 16 but it should be appreciated that the inner member of assembly 10 may also be, for example, a single polycarbonate ply or other transparent single or multi-layered plastic assemblies. In the particular embodiment of the invention illustrated in FIG. 1, attachment straps 18 and 20 are secured to opposing major surfaces of the outer glass ply 12 about its marginal edge 22 by a high strength adhesive, such as, for example, a structural epoxy modified to be compatible with glass and extend over the marginal edge 24 of the assembly 10. The straps 18 and 20 may be a metal, such as titanium or stainless, or a fabric, such as fiber glass. Although not limiting in the present invention, the attachment straps 18 and 20 are preferably fiber glass impregnated with a thermosetting resin, similar to that disclosed in U.S. Pat. No. 3,919,022 to Stefanik, which teachings are hereby incorporated by reference. If desired, the outer perimeter of the glass ply 12 can be routed to a depth equal to the thickness of the outer strap 18 and the adhesive so that when assembly 10 is laminated to form a unitary structure, it will have a flush outer surface. Wedge 26 is a filler material used to fill the gap between the straps 18 and 20 as they extend from the glass ply 12. The filler material is preferably pre-cured so that it will not flow after being applied during assembly. The marginal edge 24 of the assembly 10 is supported by an attachment arrangement including a pair of lightweight retainers 28 and 30, preferably aluminum, each of which includes an opening 32 and 33, respectively, substantially aligned with opening 34 in the laminate 16 for bolt 36 which secures retainers 28 and 30 to the assembly 10. Spacer 38 is provided in opening 34 to maintain a required distance between the retainers 28 and 30.

Bumper fairing blocks 40 fill the space between outer strap 18 and outer retainer 28. Sealants 42 and 44 are applied to the inner surfaces of the retainers 28 and 30 to seal them against the outer mounting strap 18 and the laminate 16, respectively. An edge seal 46 may be provided about the peripheral edge 48 of the assembly 10 to prevent moisture or solvents from entering the assembly 10 which may result in shorting of any electrical system incorporated into the assembly as well as causing delamination or other material degradation.

If desired, a transparent conductive coating (not shown) may be applied to the outboard surface 50 of outer glass ply 12 and connected to a ground such as the airframe (not shown) to collect static electric charges accumulated on the assembly 10. In addition, depending on the effects of double imaging due to the multi-layered design of the assembly 10, an anti-reflective coating (not shown) may be applied to an interior surface of the assembly 10. An abrasion resistant coating (not shown) may be applied to the inboard surface 52 of the polycarbonate laminate 16 to increases its effective service life. An abrasion resistant coating (not shown) may be applied to the outboard surface of the strap 18 to increase its effective service life.

As the aircraft cabin is pressurized, the assembly 10 deflects outwardly. The internal pressurization load on the assembly 10 is transferred through the retainers 28 and 30 to the airframe (not shown). Referring to FIG. 2, it can be seen that because the glass ply 12 is more rigid than the polycarbonate laminate 16, under similar loading conditions, the laminate 16 will deflect more than the glass ply 12. If the marginal edge 22 of the glass ply 12 is not restrained by the edge attachment of the assembly 10, i.e. between the retainers 28 and 30, during loading, the marginal edge 22 of the glass ply 12 will tend to pull away from the underlying marginal edge 54 of the laminate 16 since the laminate 16 provides less resistance to deflection and therefore will permit more deflection while the glass ply 12 will resist the deflection. As a result, there is a stress at the glass/laminate interface about the marginal area of the assembly 10. As the loading increases, this stress increases and the assembly 10 may begin to delaminate about its periphery.

In the particular embodiment of the invention shown in FIG. 1, the laminate 16 is secured to the outer glass ply 12 and the fiber glass straps 18 and 20, which are secured to the marginal edge 22 of the outer glass ply 12 and extend over marginal edge 24 of the assembly 10, are sandwiched between the retainers 28 and 30. The deflection of the assembly 10 is controlled by the more rigid outer glass ply 12 so that rather than the glass sheet 12 being forced to deflect more and causing delamination about its marginal area 22, the laminate 16 deflects less. In addition, since the laminate 16 deflects less than it would if it were not secured to the glass ply 12, the laminate 16, when subjected to the pressurization loading, experiences less fatigue due to the repeated loading, which could result in increased service life without delamination.

Although the preferred embodiment of the invention includes a pair of straps 18, 20 as shown in FIG. 1, it would be apparent to one skilled in the art that, based on the teaching of this disclosure the assembly 10 may include a single straps. Specifically, the outer strap 18 can be used to restrain the deflection of outer glass ply 12 without the use of the inner strap 20 and conversely, the inner strap 20 can be used without the outer strap 20.

The form of the invention shown and described in this specification represents an illustrative preferred embodiment and it is understood that various changes may be made without departing from the spirit of the invention as defined in the following claimed subject matter.

I claim:
1. A window panel assembly comprising:
 a first sheet having a peripheral edge and opposing major surfaces;
 a second sheet secured to one of said major surfaces of said first sheet and having its peripheral edge extending beyond said peripheral edge of said first sheet, said second sheet being less rigid than said first sheet;
 a strap member adhered to a marginal edge of one of said major surfaces of said first sheet, said strap member having a portion extending outwardly from said peripheral edge of said first sheet to overlay an exposed marginal edge of said second sheet; and
 means to secure said extending portion of said strap member and said marginal edge of said second sheet to a rigid edge attachment.

2. The panel as in claim 1 wherein said first sheet is a glass sheet and said second sheet is a plastic sheet.

3. The panel as in claim 2 wherein said plastic sheet includes at least one polycarbonate ply.

4. The panel as in claim 2 wherein said strap member is a fiber glass material impregnated with a thermosetting resin.

5. The panel as in claim 2 wherein said strap member is a metal strap.

6. The panel as in claim 6 wherein said strap member is a titanium strap.

7. The panel as in claim 2 wherein said strap member is a first strap member adhered to a first major surface of said first sheet and further including a second strap member adhered to a marginal edge of a second, opposing major surface of said first sheet, said second strap member having a portion extending outwardly from said peripheral edge of said first sheet to overlay said exposed marginal edge of said second sheet and means to secure said extending portion of said second strap member to said rigid edge attachment.

8. The panel as in claim 7 wherein said marginal edges of said sheets are curved and said edge attachment is contoured to generally match said curved configuration of said marginal edge of said second sheet.

9. The panel as in claim 8 wherein said edge attachment includes means to secure said panel in an opening in a vehicle.

10. The panel as in claim 9 wherein said panel is an aircraft windshield.

11. The panel as in claim 1 wherein said strap member is a first strap member adhered to a first major surface of said first sheet and further including a second strap member adhered to a marginal edge of said opposing major surface of said first sheet, said second strap member having a portion extending outwardly from said peripheral edge of said first sheet to overlay said exposed marginal edge of said second sheet and means to secure said extending portion of said second strap member to said rigid edge attachment.

12. The panel as in claim 11 wherein said strap members are a fiber glass material impregnated with a thermosetting resin.

13. The panel as in claim 12 wherein said first sheet is an outer glass sheet and said second sheet is an inner plastic laminate.

14. The panel as in claim 13 wherein said marginal edges of said sheets are curved and said edge attachment is contoured to generally match said curved configuration of said marginal edge of said second sheet.

* * * * *